No. 895,226.
PATENTED AUG. 4, 1908.
S. E. ATHERTON.
AUTOMATIC BUCKET.
APPLICATION FILED NOV. 4, 1907.
2 SHEETS—SHEET 1.
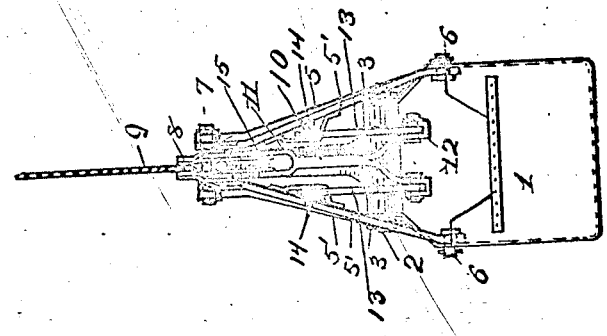
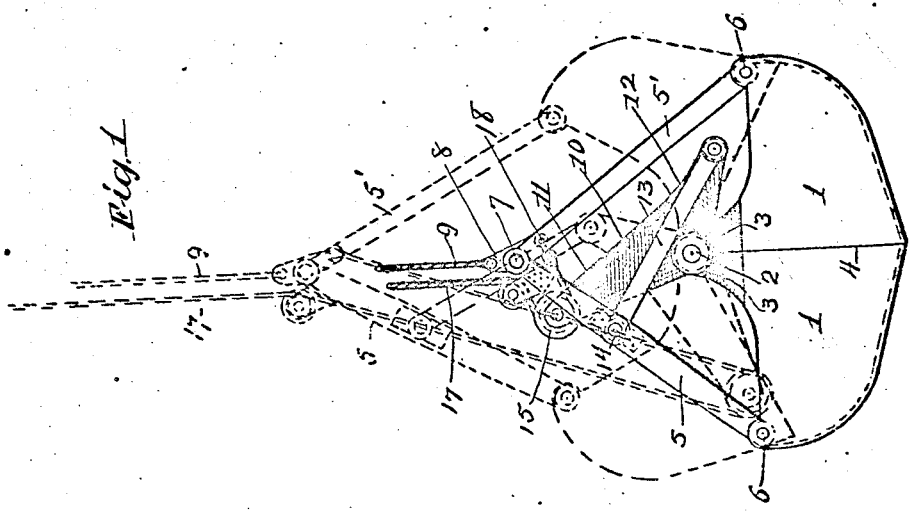
Witnesses
Geo. O'Willet
Lucille O'Neill.
Inventor
Stanley E. Atherton
by Wm. M. Monroe
Attorney

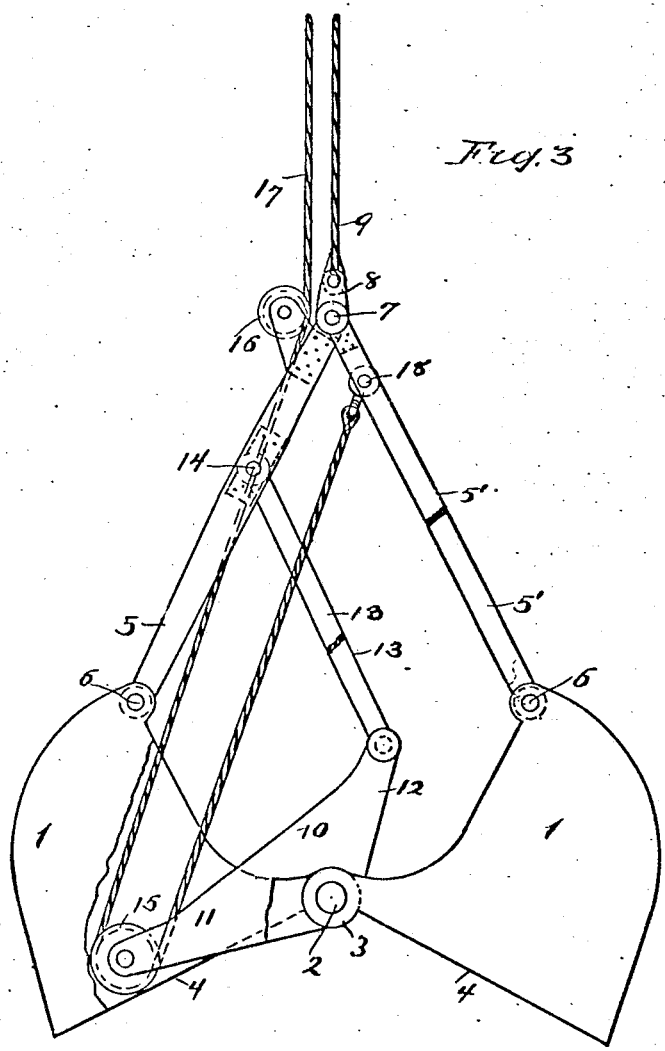

UNITED STATES PATENT OFFICE.

STANLEY E. ATHERTON, OF CLEVELAND, OHIO.

AUTOMATIC BUCKET.

No. 895,226.                Specification of Letters Patent.       Patented Aug. 4, 1908.

Application filed November 4, 1907. Serial No. 400,431.

*To all whom it may concern:*

Be it known that I, STANLEY E. ATHERTON, a citizen of the United States, and resident of Cleveland, county of Cuyahoga, State of Ohio, have invented certain new and useful Improvements in Automatic Buckets, of which I hereby declare the following to be a full, clear, and exact description, such as will enable others skilled in the art to which it appertains to make and use the same.

The objects of the invention are to provide an automatic bucket having two valves or scoop portions and in which power mechanism is employed to close the valve tightly together upon the load and which can be raised to any desired level in the closed position and afterwards the valves can be permitted to open to release the load.

The particular characteristics of this invention are found in the bell crank and lever mechanism operating conjointly upon a central common pivotal point for the valves, and upon the supporting bail arms, and employed in connection with hold up and closing lines whereby the weight of the automatic bucket may be made to provide the necessary stability and resistance to give efficency to the working parts.

The invention further consists in the combination and arrangement of parts and construction of the various details as hereinafter described, shown in the accompanying drawings and specifically pointed out in the claims.

In the accompanying drawings, Figure 1 is a side elevation of the automatic bucket showing the valves in the closed position, and showing the valves in their open position in dotted lines, and the other parts in their relative positions thereto; Fig. 2 is an edge view of the bucket shown in Fig. 1. Fig. 3 shows the positions of the parts when the valves are open.

In these views 1, 1 are the valves or scoop portions pivoted together by means of the shaft 2, which runs transversely across the top of the bucket, and is attached to the ears 3 of the buckets in line with their meeting edges 4. The pairs of bail arms 5 and 5' respectively are pivoted at 6 to the upper and outer edges of the buckets and have a common pivotal shaft 7 to which their upper ends are attached, 8 is the bail to which the hold up line 9 is secured. To close the valves tightly and powerfully together a bell crank 10 is pivoted upon the pivot shaft 2 to which the valves are attached. This bell crank is provided with the long arm 11 and short arm or preferably arms 12, 12. To the extremities of the short arms 12, 12 are pivoted at one end the links or draw bars 13, 13 the other extremities of which are pivoted at 14, 14 upon one set 5, 5, of the bail arms. The position of the pivotal point thereon being determined to obtain the greatest leverage combined with smoothness of action and efficiency of the working parts. At the outer end of the long arm of the bell crank is shown a pulley 15 and a guide pulley 16 is mounted closely adjacent to the bail arms 5, and preferably upon them. The closing line 17 is attached to a dead point 18 upon the pair of bail arms 5' and passes first over the pulley 15, thence over the guide pulley 16 and thence above and parallel to the hold up line to the ordinary hold up machine which is not a part of this invention and hence is not shown.

The device is operated by pulling upon the closing line, which has the effect of directly drawing upon the dead points in the bail arms 5' and simultaneously therewith operating the bell crank and draw bars to draw with commensurate force upon the bail arms 5, thus closing the valves tightly upon the load. In raising the bucket both lines are employed and when it is desired to release the bucket the closing line is released so that the weight of the bucket will come entirely upon the hold up line. The parts will then take the open position shown in Fig. 1.

It is important that purchase points should be obtained for the closing rope upon both the power end of the bell crank, and upon the upper portion of the bail arms, so that the parts can be brought forcibly together.

I do not confine the invention to the exact position of the dead points or the exact character of the block and tackle mechanism, but the purchase upon the bail arm or arms should be high enough thereon to provide for the necessary movement of the bell crank.

The exact relative proportions of the various parts can be modified to suit various conditions of load or desired movements and are not of the spirit of this invention but

What I claim as new and desire to secure by Letters Patent is:

1. In an automatic bucket, the combination with valves pivoted together, and provided with bail arms pivoted together at their upper ends, of a hold up line attached at said pivotal point of attachment of said bail arms, a bell crank having long and short arms, draw bars operatively connecting the short arms of said bell crank and one pair of bail arms, a pulley on said long arm of the bell crank, a guide pulley on said adjacent pair of bail arms, and a closing line, passing over said pulleys and having a dead point of attachment in the opposite pair of bail arms.

2. In combination in an automatic bucket having valves pivoted together at their upper sides in line with meeting edges, two pairs of bail arms, pivotally attached to the upper and outer edges of the valves and pivoted to each other on the center line of the bucket, and means for closing said valves together consisting of, a bell crank and pivoted shaft, said shaft forming the connecting pivot for said valves, a pair of draw bars connecting one extremity of said bell crank and one pair of bail arms, a pulley on the other extremity of said bell crank, a guide pulley closely adjacent thereto, a closing rope passing over said pulleys and having a purchase upon the bail arms, and a hold up line for said bail arms.

3. In combination, in an automatic bucket having valves pivoted together at their upper sides in line with their meeting edges, bail arms pivotally attached to the upper and outer edges of the valves and pivoted to each other on the center line of the bucket, a hold up line for said bail arms and means for closing said valves together, consisting of a bell crank and pivot shaft therefor, said pivot shaft forming also the common pivot shaft for said valves, a draw bar connecting one arm of said bell crank with the bail arms for one valve, a closing rope and a block and tackle device connecting the outer end of the other arm with one of said bail arms substantially at the upper extremity thereof.

In testimony whereof I hereunto set my hand this 26th day of October 1907.

STANLEY E. ATHERTON.

Witnesses:
GEO. S. COLE,
WM. M. MONROE.